United States Patent [19]
Beutler et al.

[11] Patent Number: 6,008,681
[45] Date of Patent: Dec. 28, 1999

[54] METHOD AND APPARATUS FOR DERIVING POWER FROM A CLOCK SIGNAL COUPLED THROUGH A TRANSFORMER

[75] Inventors: Thomas Grey Beutler, Tustin; Raphael Rahamim, Orange, both of Calif.

[73] Assignee: Conexant Systems, Inc., Newport Beach, Calif.

[21] Appl. No.: 09/088,629

[22] Filed: Jun. 2, 1998

[51] Int. Cl.⁶ .................................................. H03K 1/04
[52] U.S. Cl. ........................................ 327/304; 327/300
[58] Field of Search .................................. 327/291, 300, 327/304, 298, 110; 363/26, 133

[56] References Cited

U.S. PATENT DOCUMENTS

| | | | |
|---|---|---|---|
| 4,499,532 | 2/1985 | Hudson et al. | 363/21 |
| 5,369,666 | 11/1994 | Folwell et al. | 375/8 |
| 5,471,470 | 11/1995 | Sharma et al. | 370/81 |
| 5,721,506 | 2/1998 | Imam et al. | 327/330 |
| 5,736,884 | 4/1998 | Ettes et al. | 327/304 |

FOREIGN PATENT DOCUMENTS

| | | |
|---|---|---|
| 61-67246 | 9/1986 | Japan. |
| 61-222239 | 10/1986 | Japan. |
| 2237139 | 9/1990 | Japan. |
| 6-53554 | 2/1994 | Japan. |
| 6198669 | 7/1994 | Japan. |

*Primary Examiner*—Toan Tran
*Attorney, Agent, or Firm*—Price, Gess & Ubell

[57] ABSTRACT

A transformer driver circuit connected to the primary or "system" side of a transformer has a system clock connected to an input thereof the system clock having a frequency selected to constitute the desired clock frequency of a CODEC circuit located on the secondary or "line" side of the transformer. A signal line is connected to a point on the secondary of the transformer so as to tap the system clock frequency, whereby both the system clock and the source voltage for the CODEC are derived from the transformer's secondary.

19 Claims, 1 Drawing Sheet

METHOD AND APPARATUS FOR DERIVING POWER FROM A CLOCK SIGNAL COUPLED THROUGH A TRANSFORMER

BACKGROUND OF THE INVENTION

1. Field of the Invention

The subject invention relates generally to the field of communications and more particularly to circuitry designed to provide power and a clock signal across a high voltage isolation barrier.

2. Description of Related Art

Digital telephone coder-decoder circuits [CODEC's] are known in the prior art for performing digitization of voice signals. In order to operate a CODEC connected directly to a telephone line, it is necessary to provide a system clock and power to the line side of the high voltage isolation barrier. For a variety of reasons, locating a CODEC on the line side of the high voltage isolation barrier appears to the inventors to be a good approach to creating a VLSI device for a low cost, high performance telephone interface.

Conventionally, power has been transferred across the high voltage isolation barrier by a DC-to-DC converter or derived from the telephone line loop current. A system clock is sent across the barrier by a separate electrical circuit, extracted from the data, or generated locally on the line side, which is both expensive and inaccurate.

OBJECTS AND SUMMARY OF THE INVENTION

According to the invention, a clock at a desired system clock frequency is used to drive the primary of a transformer. The primary is located on the system side of the high voltage isolation barrier. The output from the secondary of the transformer is rectified and filtered to provide power to the line side of the high voltage isolation barrier. The system clock frequency is derived from the secondary of the transformer and supplied to the appropriate point on the line side of the high voltage isolation barrier.

The approach of the invention provides a very reliable clock signal from a source on the system side of the high voltage isolation barrier to a CODEC on the line side of the high voltage isolation barrier. Jitter and duty cycle changes are minimal, and no feedback between the primary and secondary is involved.

When the CODEC is not operating, inactive sections of the line side VLSI device are preferably shut down by a system control circuit to conserve power. At the same time, the frequency of the system clock signal is reduced to a lower frequency to reduce the power dissipated in the transformer.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventors of carrying out their invention Various modifications, however, will remain readily apparent to those skilled in the art.

Figure 1:
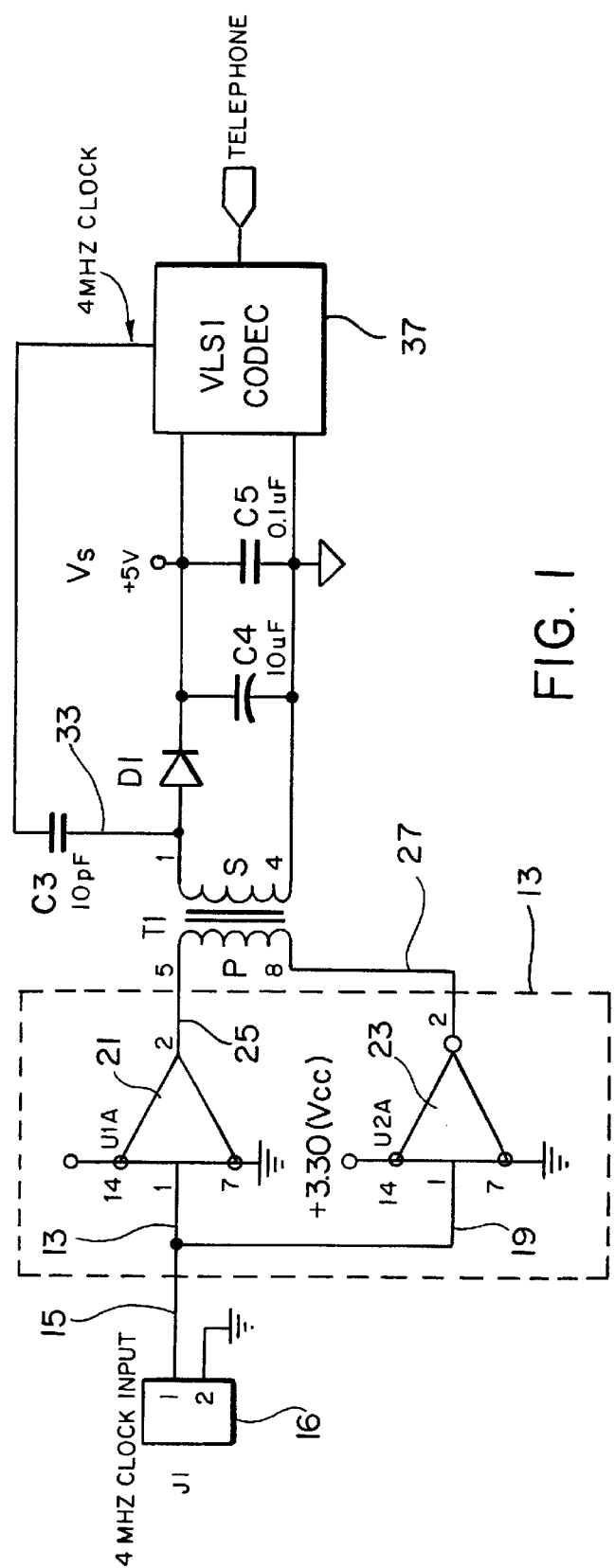
FIG. 1 is a circuit diagram illustrating the preferred embodiment of the invention.

The preferred embodiment of the invention is illustrated in FIG. 1. The preferred embodiment includes a transformer driver circuit 13 connected to the primary side of a transformer $T_1$. The primary side P of transformer $T_1$ lies on the "system side" of the circuitry where the "system side" could comprise, for example, a modem, fax machine, personal computer, etc. The electrical characteristics of the transformer $T_1$ are designed to satisfy the applicable regulatory requirements, i.e., FCC part 68, etc.

The transformer driver circuit 13 receives an input on a line 15 from the system clock 16, which provides a system clock signal at a frequency of, for example, 4 MHz. The system clock signal is provided via line 18 to the input of a noninverting driver 21 and via line 19 to the input of an inverting driver 23. The output 25 of the noninverting driver 21 is connected to a first terminal of the primary P, while the output 27 of the inverting driver 23 is connected to a second terminal of the primary P. Each respective driver 21, 23 is connected to a source voltage $V_{cc}$, which may be, for example, 3.3 volts.

The secondary S of the transformer $T_1$ has a first terminal connected to the anode of a diode $D_1$ and its second terminal grounded. A capacitance is connected from the cathode of the diode $D_1$ to ground and may comprise fit and second capacitors C4, C5, for example, of 10 microFarads ($\mu F$) and 0.1 microFarads respectively. The secondary S develops a nominal DC voltage $V_s$, which may be, for example, 5 volts DC. The voltage $V_s$ is shown as being applied to a VLSI CODEC circuit 37. As further shown in FIG. 1, the system clock frequency appearing at secondary S is tapped by a signal line 33 through a blocking capacitor C3 to the VLSI CODEC 37.

Figure 2:
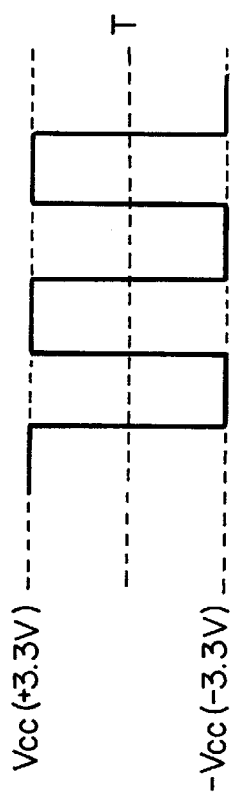
FIG. 2 is a waveform diagram useful in illustrating operation of the preferred embodiment of the invention.

In operation, the transformer driver 13 on the primary or "system" side of the transformer $T_1$ generates a voltage waveform across the primary of transformer $T_1$ which is illustrated in FIG. 2. It will be noted that the waveform of FIG. 2 provides a voltage swing which is equal to 2 $V_{cc}$ between levels of $+V_{cc}$ and $-V_{cc}$ at the frequency of the system clock input. Thus, for example, if $V_{cc}$ is 3.3 volts and the system clock frequency is 4 MHz, the wave form of FIG. 2 exhibits a 6.6 volt swing between +3.3 volts and −3.3 volts at a frequency of 4 Mhz.

In the specific example which has been discussed above, the 4 MHz system clock frequency appearing on the primary side P of the transformer $T_1$ also appears at the secondary S and is supplied to the VLSI CODEC circuit 37. Those skilled in the art will appreciate that the circuit of FIG. 1 may be viewed as comprising a transformer driver circuit wherein the driver circuit frequency is at a selected system clock frequency, which frequency is then tapped from the secondary side of the driver circuit for a supply to a VLSI CODEC 37.

Those skilled in the art will further appreciate that many other circuit configurations may be used to achieve the operation of the transformer driver circuit 13. Moreover, in the embodiment shown, the driver circuits 21, 23 may each constitute a respective constant current source driver if desired.

Those skilled in the art will thus appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A circuitry comprising:
   a transformer having a primary side and secondary side;
   a transformer driver circuit connected to said primary side and having a system clock connected to an input thereof said system clock having a frequency selected to be the desired clock frequency of a circuit connected to said secondary side; and
   a signal line connected to a point in the secondary of said transformer where said system clock frequency appears, said signal line being connected to tap said system clock frequency for supply to said circuit.

2. The circuitry of claim 1 wherein said transformer driver circuit comprises first and second driver circuits, each having a respective output.

3. The circuitry of claim 2 wherein said system clock is connected to an input of each respective driver circuit.

4. The circuitry of claim 3 wherein the output of said first driver circuit is connected to a first terminal of the primary of said transformer and the output of the second driver circuit is connected to a second terminal of the primary of said transformer.

5. The circuitry of claim 4 wherein said secondary side has a diode connected to a first terminal thereof.

6. The circuitry of claim 5 wherein said diode has a second terminal connected to a capacitance, said capacitance having a second terminal connected to ground.

7. A circuitry comprising:
   a power converter circuit having a secondary side and a system clock frequency applied at a primary side thereof, said system clock frequency selected to be the desired clock frequency of a circuit connected to said secondary side; and
   a signal line connected to a point in the secondary of said power converter circuit where said system clock frequency appears, said signal line being connected to tap said system clock frequency for supply to said circuit.

8. The circuitry of claim 7 wherein said power converter circuit includes a transformer driver circuit connected to the primary of a transformer.

9. The circuitry of claim 8 wherein said transformer driver circuit comprises first and second driver circuits.

10. The circuitry of claim 8 wherein the output of said first driver circuit is connected to a first terminal of the primary of said transformer and the output of said second driver circuit is connected to a second terminal of the primary of said transformer.

11. The circuitry of claim 10 wherein said transformer has a secondary having a diode connected to a first terminal thereof.

12. The circuitry of claim 11 wherein said diode has a second terminal connected to a capacitance, said capacitance having a second terminal which is grounded.

13. A method of generating a clock signal comprising the steps of:
   arranging a power converter circuit to generate a first voltage at a secondary side thereof to a circuitry in response to application of said a clock signal and a second voltage to a primary side thereof;
   selecting the frequency of said clock signal to be the clock frequency of a system clock used for operation of said circuitry on said secondary side; and
   tapping said clock frequency from said secondary side to generate said system clock for said circuitry.

14. The method of claim 13 wherein said circuitry comprises a CODEC.

15. The method of claim 14 wherein said CODEC forms part of a VLSI device and further including the step of shutting down inactive portions of the VLSI device when said CODEC is not operating.

16. The method of claim 15 further including the step of lowering the frequency of said system clock to maintain the line side power supply voltage in proper range.

17. The circuitry of claim 12 wherein said circuit comprises a CODEC.

18. The circuitry of claim 1 wherein said circuit comprises a CODEC.

19. The circuitry of claim 7 wherein said circuit comprises a CODEC.

* * * * *